Patented Jan. 18, 1944

2,339,282

UNITED STATES PATENT OFFICE 2,339,282

PROCESS FOR MAKING LOWER DI-CARBONYLIC COMPOUNDS

Raymond W. McNamee, South Charleston, and Jesse T. Dunn, Charleston, W. Va., assignors to Carbide and Carbon Chemicals Corporation, a corporation of New York No Drawing. Application July 30, 1940, Serial No. 348,438

10 Claims. (Cl. 260—603)

The 1,2 dicarbonylic compounds having from two to three carbon atoms may be obtained at present by careful oxidation of ethylene or propylene glycol with chemical oxidizing agents, notably nitric acid and selenium dioxide. The disadvantages of such methods are the cost of the oxidizing agents required and the explosive and toxic hazards involved.

It has been proposed to manufacture these dicarbonylic compounds by the direct oxidation of ethylene or propylene glycol with molecular oxygen in amounts less than that theoretically required, i. e., less than one mol of molecular oxygen per mol of glycol. This method of operation is not completely successful because lower oxidation products of these glycols than dicarbonylic compounds are produced and the dicarbonylic compounds which are formed are extremely difficult if not impossible to isolate in the free state. This is because the dicarbonylic compounds have a pronounced tendency to react with the excess glycol present to form high-boiling, stable acetals or other complex condensation products.

The object of this invention is to prepare the aforesaid 1,2-dicarbonylic compounds by the direct oxidation of ethylene or propylene glycols or their corresponding polyglycols in a form from which the pure compounds, or their hydrates or polymers, can be isolated.

This invention provides specific improvements in the process of making the lower dicarbonylic compounds, glyoxal and pyruvic aldehyde, by the direct vapor phase oxidation of the 1,2-alkylene glycols, ethylene and propylene glycols, respectively, or the corresponding 1,2-polyalkylene glycols, such as di-, tri-, tetra-, penta- or hexaethylene of propylene glycols, whereby a substantial excess of molecular oxygen above that theoretically required is employed. By this means a practically complete conversion of the glycols to oxidation products is obtained and no appreciable amounts of reaction products of the dicarbonylic compounds and the glycols are formed.

Glyoxal and pyruvic aldehyde are chemicals of interesting and unusual properties. Glyoxal is a greenish-yellow solid melting at 15° C. and boiling at 51° C. It is difficult to isolate in the monomeric form because it polymerizes readily and because it readily forms a colorless hydrate with water. Pyruvic aldehyde is a low-boiling liquid of similar properties. Both chemicals are extremely reactive by virtue of the two carbonyl groups which they contain and they are useful as intermediates in a variety of syntheses. By means of this invention, these products may be produced in economic yields which enables their reactive characteristics to be utilized industrially.

The oxdation of the glycols previously mentioned to dicarbonylic compounds is conducted in the vapor phase and in the presence of a metal or metal oxide oxidation catalyst. The catalyst which may be selected for promoting the desired oxidation is preferably composed of copper and several forms of copper catalysts may be used. A particularly effective type is one composed of turnings of a copper alloy containing from 94.4% to 96% copper, from 3% to 4.5% silicon and from 1.0% to 1.1% manganese. A supported copper catalyst may be formed by impregnating particles of a catalyst support consisting of ceramically bonded fused aluminum oxide with a concentrated boiling solution of copper nitrate and roasting the resultant material at 400° C. until a firm deposit of copper oxide is obtained. Supported catalysts of this kind desirably contain from about 3% to about 8% copper. The copper oxide catalysts may also contain small amounts of manganese oxide as an adjuvant catalyst or they may be promoted by the addition of activated alumina. Such catalysts are very active but they necessitate close control of the reaction. Other oxidation catalysts, notably silver, silver oxide, and molybdic oxide promoted by titanium oxide have outstanding catalytic action on the oxidation of the glycols and good yields of dicarbonylic compounds have been obtained in the presence of these catalysts.

The temperature and rate of feed of the glycol to be oxidized are not critical but preferred operating ranges exist. Temperatures within the range of 225° C. to 450° C. are the desired operating levels and the preferred temperature is between 275° C. and 350° C. The rate of feed of the polyhydric alcohol to the oxidation zone may vary widely; the desired operating range being between 50 to 250 grams per hour per liter of catalyst space.

The improvement which this invention contemplates is the conduct of the oxidation under such conditions that the glycol is substantially converted to oxidation products. This is achieved by the use in the oxidation zone of an excess of molecular oxygen over that theoretically required to oxidize each carbinol group of the glycol to a carbonyl group. In the oxidation of the glycol to the dicarbonylic compound, the theoretical amount of oxygen required is one mol of oxygen per mol of glycol as represented by the following equation for the oxidation of ethylene glycol to glyoxal.

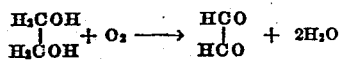

To achieve the object of this invention, the amount of effective oxygen mixed with the glycol in the oxidation zone should be at least 1.8 times that theoretically required for conversion of each carbinol group to a carbonyl group, and better results are obtained if from 2.5 to 15 times the theoretical amount of oxygen is employed.

In the oxidation of ethylene and propylene glycols to the corresponding dicarbonylic compounds, the use of a substantial excess of molecular oxygen in the oxidation zone is essential. Thus, ethylene glycol was oxidized over a copper catalyst at a temperature of about 300° C. and enclosed in a reaction tube constructed of a copper-silicon-manganese alloy, with about 85% of the theoretical amount of molecular oxygen. It was found that no glyoxal, as such, could be isolated from the reaction products, although a 10% yield of its high-boiling, relatively stable acetal derivatives with glycol, such as naphthodioxane, was obtained and a positive colorimetric test for glyoxal was noted. A 10% yield of 2-hydroxymethyl-1,3-dioxolane, a lower oxidation product of glycol, was also produced, presumably according to the reaction described in United States Patent No. 2,140,938 to R. W. McNamee and C. M. Blair. Tests have shown that neither 2-hydroxymethyl-1,3-dioxolane nor naphthodioxane, the products of the reaction just described, can be oxidized to glyoxal, so that these compounds cannot be regarded as intermediates formed in the oxidation of glycol to glyoxal.

The following example will serve to illustrate the improvements in the oxidation of glycols effected solely by causing a substantial excess of molecular oxygen to be present in the oxidation zone. Further improvements are brought about by the use as well of an oxidation repressant to reduce the amount of monocarbonylic aldehydes and carbon dioxide formed as described in our copending application Serial No. 348,439, and as illustrated in Example 2. The material of construction of the oxidation converter in each case was one that does not exert an adverse catalytic effect on the desired oxidation as described in our copending application Serial No. 348,440.

*Example 1*

A converter was constructed of a copper-silicon-manganese alloy in the form of a tube one inch in diameter and three feet long. Two feet of this tube were packed with turnings of the same alloy as a catalyst and temperature control was provided by a jacket on the reaction tube filled with a high-boiling liquid. The temperature of the reaction zone was adjusted to 350° C. and a gas mixture containing 20% oxygen (13.3 times that theoretically required) and 1.5% ethylene glycol vapor by volume was passed through the catalyst zone at a rate of 8.5 cubic feet per hour. A yield of 16.5% glyoxal and 28.8% formaldehyde and formic acid was obtained. The remainder of the ethylene glycol was converted to other oxidation products, such as carbon oxides and water. The glyoxal was recovered in the form of its hydrate by scrubbing the exit gases with water. Glyoxal can readily be separated from the condensate from the scrubber by adding a solvent for the glyoxal, such as dioxane, to the aqueous condensate, removing most of the excess water by azeotropic distillation with benzene and then distilling over the glyoxal and the dioxan. This distillate is caught in water and the dioxan removed therefrom by simple distillation. An aqueous solution of purified glyoxal results.

*Example 2*

A converter was constructed of a copper-silicon-manganese alloy in the form of a tube one inch in diameter and three feet long. Two feet of this tube were packed with turnings of the same alloy. The temperature of the reaction zone was adjusted to 325° C. and a gas mixture containing 2.5% ethylene glycol and 10% oxygen by volume (4 times the required amount), along with a very small amount of ethylene dichloride as a repressant for undesired oxidations, was passed over the catalyst at a rate of 8.5 cubic feet per hour. A yield of 65.5% of glyoxal and 7.5% of formaldehyde and formic acid was obtained. The remainder of the ethylene glycol was converted to other oxidation products.

Modifications of the invention other than as described in the foregoing examples will be apparent to those skilled in the art and are included within the scope of the invention as defined by the appended claims.

We claim:

1. Process for making 1,2-dicarbonylic compounds having from two to three carbon atoms, which comprises mixing the vapors of one of the group consisting of 1,2-alkylene glycols containing from two to three carbon atoms and 1,2-polyalkylene glycols having from two to three carbon atoms in each alkylene group with at least 1.8 times the amount of molecular oxygen theoretically required to oxidize each carbinol group to a carbonyl group, and passing the vapors over one of the group consisting of metal and metal oxide oxidation catalysts at a temperature between 225° and 450° C., substantially converting the glycol to oxidation products, and recovering one of the group consisting of said dicarbonylic compounds and their hydrates and polymers from the oxidation products.

2. Process for making 1,2-dicarbonylic compounds having from two to three carbon atoms, which comprises mixing the vapors of one of the group consisting of 1,2-alkylene glycols containing from two to three carbon atoms and 1,2-polyalkylene glycols having from two to three carbon atoms in each alkylene group with at least 1.8 times the amount of molecular oxygen theoretically required to oxidize each carbinol group to a carbonyl group, and passing the vapors over an oxidation catalyst containing copper at a temperature between 225° and 450° C., substantially converting the glycol to oxidation products, and recovering one of the group consisting of said dicarbonylic compounds and their hydrates and polymers from the oxidation products.

3. Process for making 1,2-dicarbonylic compounds having from two to three carbon atoms, which comprises mixing the vapors of one of the group consisting of 1,2-alkylene glycols containing from two to three carbon atoms and 1,2-polyalkylene glycols having from two to three carbon atoms in each alkylene group with at least 1.8 times the amount of molecular oxygen theoretically required to oxidize each carbinol group to a carbonyl group, and passing the vapors over an oxidation catalyst containing silver at a temperature between 225° and 450° C., substantially converting the glycol to oxidation products, and recovering one of the group consisting of said dicarbonylic compounds and their hydrates and polymers from the oxidation products.

4. Process for making 1,2-dicarbonylic compounds having from two to three carbon atoms, which comprises mixing the vapors of one of the group consisting of 1,2-alkylene glycols containing from two to three carbon atoms and 1,2-polyalkylene glycols having from two to three carbon atoms in each alkylene group with at least 2.5 to 15 times the amount of molecular oxygen theoretically required to oxidize each carbinol group to a carbonyl group, and passing the vapors over an oxidation catalyst containing copper at a temperature between about 275° and about 350° C., substantially converting the glycol to oxidation products, and recovering one of the group consisting of said dicarbonylic compounds and their hydrates and polymers from the oxidation products.

5. Process for making 1,2 dicarbonylic compounds having from two to three carbon atoms, which comprises subjecting the vapors of one of the group consisting of 1,2-alkylene glycols containing from two to three carbon atoms and 1,2-polyalkylene glycols having from two to three carbon atoms in each alkylene group to oxidation at a temperature of 225° to 450° C. and in the presence of a catalyst containing copper with from 2.5 to 15 times the amount of molecular oxygen theoretically required to oxidize each carbinol group of the glycol to a carbonyl group, and recovering one of the group consisting of said dicarbonylic compounds and their hydrates and polymers from the oxidation products.

6. Process for making glyoxal, which comprises passing the vapors of ethylene glycol mixed with at least 1.8 mols of molecular oxygen per mol of glycol over one of the group consisting of metal and metal oxide oxidation catalysts at a temperature of 225° to 450° C., substantially converting the glycol to oxidation products, and recovering one of the group consisting of glyoxal and its hydrates and polymers from the oxidation products.

7. Process for making glyoxal, which comprises subjecting the vapors of ethylene glycol at a temperature of 225° to 450° C. and in the presence of a catalyst containing copper to oxidation with at least 1.8 mols of molecular oxygen per mol of ethylene glycol, and recovering one of the group consisting of glyoxal and its hydrates and polymers from the oxidation products.

8. Process for making glyoxal which comprises passing the vapors of ethylene glycol mixed with at least 1.8 mols of molecular oxygen per mol of glycol over an oxidation catalyst containing silver at a temperature between 225° and 450° C., and recovering one of the group consisting of glyoxal and its hydrates and polymers from the oxidation products.

9. Process for making glyoxal, which comprises subjecting the vapors of ethylene glycol at a temperature of 225° to 450° C. and in the presence of a catalyst containing copper to oxidation with from 2.5 to 15 times the amount of molecular oxygen theoretically required to convert each carbinol group of the glycol to a carbonyl group, and recovering one of the group of glyoxal and its hydrates and polymers from the oxidation products.

10. Process for making pyruvic aldehyde which comprises passing the vapors of propylene glycol mixed with at least 1.8 mols of molecular oxygen per mol of glycol over an oxidation catalyst containing copper at a temperature between 225° and 450° C., and recovering one of the group consisting of pyruvic aldehyde and its hydrates and polymers from the oxidation products.

RAYMOND W. McNAMEE.
JESSE T. DUNN.